US008731195B2

(12) United States Patent
Raman et al.

(10) Patent No.: US 8,731,195 B2
(45) Date of Patent: May 20, 2014

(54) METHOD AND SYSTEM FOR INITIATING SECURE TRANSACTIONS WITHIN A DEFINED GEOGRAPHIC REGION

(75) Inventors: Madhusudan Raman, Sherborn, MA (US); Renu Chipalkatti, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 27 days.

(21) Appl. No.: 13/475,606

(22) Filed: May 18, 2012

(65) Prior Publication Data

US 2013/0312071 A1 Nov. 21, 2013

(51) Int. Cl.
*H04L 1/14* (2006.01)
*H04L 9/36* (2006.01)

(52) U.S. Cl.
USPC ............................................. 380/247; 713/161

(58) Field of Classification Search
None
See application file for complete search history.

(56) References Cited

U.S. PATENT DOCUMENTS

2009/0132813 A1* 5/2009 Schibuk ...................... 713/158

OTHER PUBLICATIONS

Localized Credentials for Server Assisted Mobile Wallet. Mjolsnes et al. IEEE(2001).*
Developing GIS—supported location—based services. Virrantaus et al. IEEE(2002).*

* cited by examiner

*Primary Examiner* — Venkat Perungavoor

(57) ABSTRACT

An approach for enabling contextual categories to be associated and scored in connection with a defined geographic region is described. A transient services platform establishes, based on biometric authentication of a user, a limited session for completing a transaction. The transient services platform then determines, based on a defined geographic region, a context to associate with the transaction. Credentials associated with the user are transferred to the transaction agent based on the authentication and the determined context.

18 Claims, 9 Drawing Sheets

300

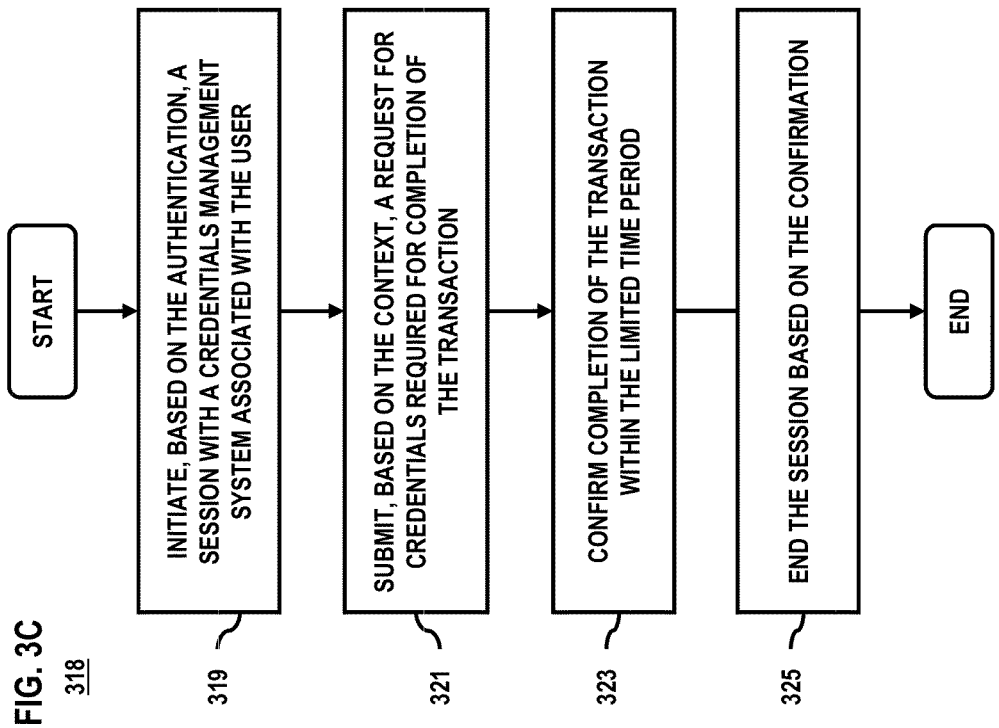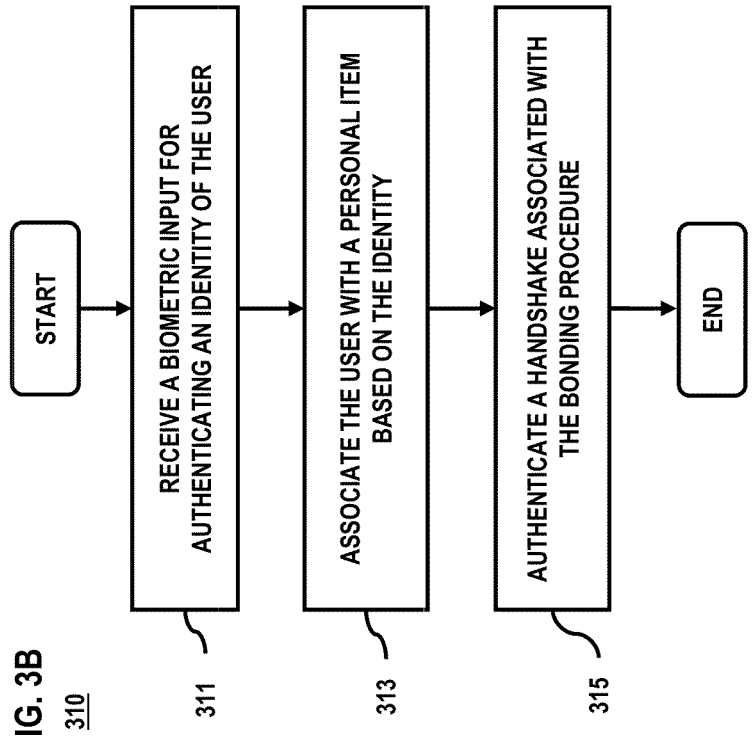

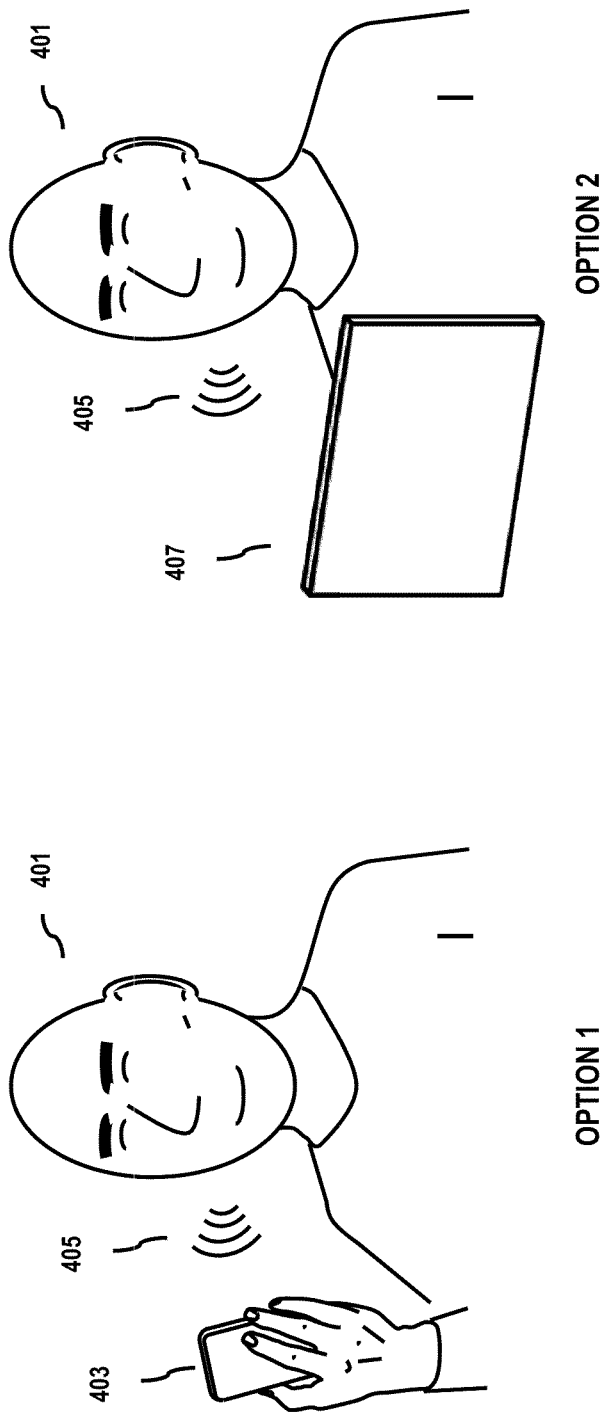

METHOD AND SYSTEM FOR INITIATING SECURE TRANSACTIONS WITHIN A DEFINED GEOGRAPHIC REGION

BACKGROUND INFORMATION

Service providers are continually challenged to deliver value and convenience to consumers by providing compelling network services and advancing the underlying technologies. One area of interest has been the development of services for enabling secure execution of transactions. Typically, service providers designate Trusted Service Managers (TSM) and associated one time passwords in software, hardware or a combination of both to facilitate secure execution. Resultantly, the context of the transactional session to be performed is based on what the user uniquely knows (e.g., a pin or rolling password) and what the user has in their physical possession (e.g., a phone with a specific type of e-mail client and/or digital key fob). Still further, some transactional sessions require direct validation of location or presence information provided by the user's mobile device. Hence, traditional approaches provide no convenient way to facilitate execution of transactions without reliance upon user or device centric contextual information.

Based on the foregoing, there is a need for enabling transactions to be performed securely and efficiently.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3C are flowcharts of processes for enabling transactions to be performed securely within a defined geographic region, according to various embodiments;

FIGS. 4A-4C are diagrams depicting a user accessing the transient services platform of FIG. 2 to perform a transaction via a transaction agent, according to various embodiments;

DESCRIPTION OF THE PREFERRED EMBODIMENT

An apparatus, method and software for enabling transactions to be performed securely within a defined geographic region is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form to avoid unnecessarily obscuring the present invention.

Although the various exemplary embodiments are described with respect to transactions, it is contemplated these embodiments have applicability to any instructions, activities, or processes to be carried out in connection with a user or item associated with the user, including software and hardware related processes. Also, while various embodiments are described with respect to personal items of a user in the form of a mobile device, it is contemplated these embodiments have applicability to any sensor based items, including encoded cards (e.g., plastic cards, Smart Cards), personal sensors (e.g., fobs or identification transmitters) and the like.

Figure 1:
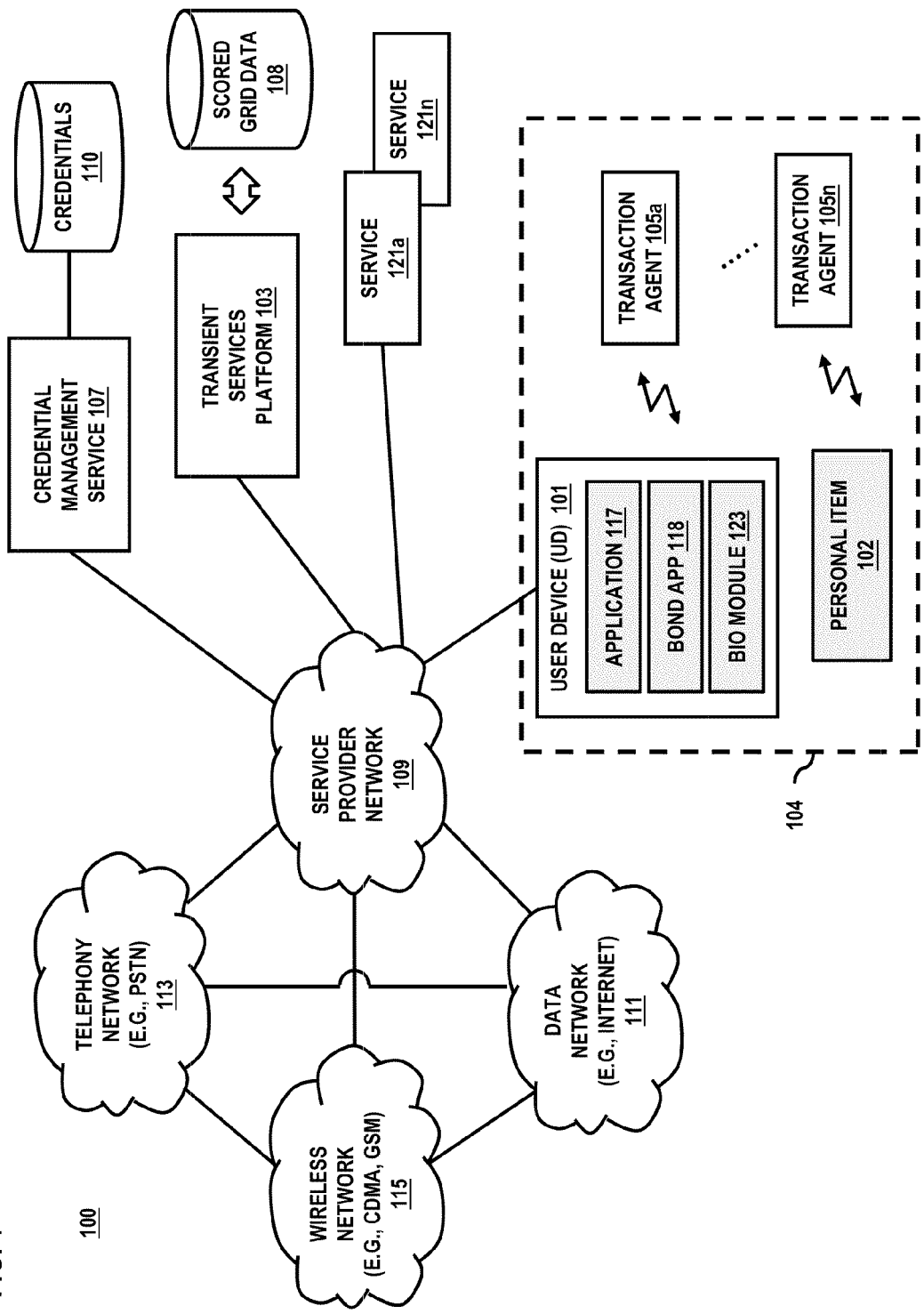
FIG. 1 is a diagram of a system for enabling transactions to be performed securely within a defined geographic region, according to one embodiment.

FIG. 1 is a diagram of a system for enabling transactions to be performed securely within a defined geographic region. As noted previously, different types of transactions may be carried out by users today by way of wireless means or automated means. For example, a secure purchase transaction may be carried out via a user's mobile device, wherein the user submits their payment credentials to a vendor via wireless communication such as near-field communication (NFC) or other short-range communication. Under this scenario, the identification of the mobile device through which the transaction is performed is required in addition to entry of a password or other security credential known to the user. Still further, the transaction is initiated in response to detection of the user being physically located at a certain place or within proximity of a supporting Trusted Service Manager (TSM).

Hence, the context of the transaction is directly indicated by the user or discerned by way of various active sensors of the user's mobile device. Unfortunately, traditional approaches provide no convenient way to facilitate execution of transactions without reliance upon user or device centric contextual information being directly provided. Still further, many applications and services that facilitates execution of transactions rely upon manual data entry (e.g., entry of credit card numbers or pin number) as a function of the application or for security reasons; thus limiting the ability of users to seamlessly execute secure transactions of various contexts (e.g., types) as they travel about.

To address this issue, the system 100 includes a transient services platform 103 that enables a combination of security and location based featured to be performed in connection with the facilitation of a transaction. By way of example, the transient services platform 103 is configured to manage a session for enabling a transaction completion process to be carried out over a limited period of time. The limited time frame corresponds to a one-time execution of the session in response to a request. Also, the limited time frame corresponds to a period of time (e.g., seconds) in which the user may provide the necessary inputs required to facilitate the transaction or the allotted time for completion of the overall transaction.

The transactional session is performed in connection with the user and various transaction agents 105a-105n. Initiation of the request as well as fulfillment of the transaction for the user can be based on the following: (a) what the user uniquely knows (e.g., a password, fact, authoriziation data); (b) what the user uniquely has (e.g., a personal item associated with the user); (c) what the user uniquely is (e.g., a confirmed/authorized user or agent for initiating and completing the transaction); and (d) contextual derivation of applicability.

The above described factors correspond to one or more security and/or location based executions that are managed by the transient services platform 103. In particular, the executions are enabled to be performed with minimal intervention of the user beyond the point of user authorization to carry out the transaction (e.g., item (c) above). Moreover, the context of the transaction may be determined with no reliance upon sensed/collected/real-time context information gathering by a device (e.g., user device 101) associated with the user. Rather, in certain embodiments, the transient services platform 103 accesses scored grid data 108 for deriving a relative location of the user and associating a context (e.g., a transaction type) with the user based on the location. The scored grid data may be accessed from third-party location based service (e.g., service 121) or other enabling data repository made available to the transient services platform 103 or service provider thereof.

By way of example, the scored grid data 108 includes data corresponding to location information references via defined grid database 108, e.g., United States National Grid (USNG) reference system or any other reference grid. Alternatively, the defined grid data 108 may include any other location data source, geodetic data source, topographic data source, geographic information system or the like for specifying and naming points/coordinates within a particular geographic region. Still further, the scored grid data 108 is associated with one or more scores/and or signal strengths, which represent a level of affinity of the defined geographic area 104 with specific contextual categories. The level of affinity, therefore, represents a likelihood of presence, prevalence or concentration of specific points-of-interest (POIs) matching a particular contextual category associated with the defined geographic region 104, e.g., a 10×10 meter region for the USNG. For example, in the case of a scaled ranking from 1-to-10, a score of 8.2 for POIs corresponding to the contextual category of "Restaurants" may indicate a higher propensity for restaurants to be located within the same geographic region than "Amusement Parks" at 2.4. Hence, the transient services platform 103 may deduce, based on the scored grid data 108, that a transaction request associated with the defined geographic region 104 is associated with a restaurant transaction. It is noted, also, that the scores may also correspond to a strength signal and associated color coding for indicating the level of affinity of the region 104 with a given context as well as a contextual category (e.g., transaction type) of which the region 104 is aligned.

As will be discussed further, the transaction agents 105a-105n may be placed at various locations throughout the defined geographic region 104 for use in connection with the transient services platform 103 to facilitate a transactional session. The scored grid data 108 may therefore be cross-referenced against a list of known transactional agents corresponding to the geographic area for deducing a related context of the transaction.

In certain embodiments, one or more transaction agents 105a-105n, are configured for operation within a defined geographic region 104 to interact with a personal item of the user for facilitation of a transactional session. In certain embodiments, the transaction may include any series of steps, processes or executions required to enable fulfillment of an arrangement between parties, e.g., a vendor and a user. The transaction may include a purchase transaction, a data access transaction, a security transaction, an actuation action, or the like. Under this scenario, the transaction may be associated with a parking garage, a vending mechanism, a security gate, a door lock, turnstiles, person-to-person payments, a data download, server access, facility entry, ticket and/or coupon redemption, etc.

The transaction agents 105a-105n are configured, in certain embodiments, to be placed within proximity of the location of the transaction. For instance, in the case of a transaction involving a turnstile, the transaction agent may be implemented as a software or hardware device that is incorporated within, affixed to, or placed near the turnstile. Similarly, in the case of a vendor booth, the transaction agent may be incorporated within a point-of-sales terminal or placed in a location that is visible to the user near the booth. Under this scenario, the transaction agent 105 may include various wireless and/or sensor detection components for both transmitting and receiving signals from the mobile device 101 or other personal item 102 of a user. Hence, transaction agents 105a-105n may be used to initiate and facilitate execution of a transaction in connection with the user device 101 or other personal item 102. The personal item may include a user device (UD) 101 of the user, a sensor based card, a personal transmitter (e.g., fob or radio frequency transmitter) or the like.

In certain embodiments, the transient services platform 103 manages the various transaction agents 105a-105n, including facilitating execution of a transaction based on a bonding procedure between the transaction agents and the personal item 102 and/or user device 101. By way of example, a bonding procedure pertains to the ability of a user to seamlessly transfer transaction related credentials, such as passwords, credit card information or identification data, to a corresponding transaction agent 105a-105n. Under this scenario, the credentials are accessed from a credential management service 107 that maintains credentials data 110 in connection with a given user. As such, the transient services platform 103 interacts with the credential management service 107 to access the data 108 in response to a request for completion of a transaction in connection with a user via a transaction agent 105.

It is noted that the transient services platform 103 may therefore, operate in direct connection with or on behalf of the various transaction agents and/or the credential management services. The transient services platform 103 is configured to communicate with the carious transaction agents 105a-105n independently, or in connection with one or more associated services operable in conjunction with the agents 105a-105n. This may include, for example, a payment processing service or order fulfillment service. While implementations may vary, the transient services platform 103 is configured to bridge the transactional executions of the respective services 121a-121n, transaction agents 105a-105n and respective sites where said transactions are to occur. Also, in the case of a personal item in the form of a user device (UD) 101, e.g., mobile device, the transient services platform 103 permits various applications 117 having functions for carrying out transactions to be fulfilled with minimal interaction of the user.

For the purpose of illustration, the bond is formulated based on a "handshake" or other triggering mechanism related to or initiated by the user. Hence, the handshake for initiating a bond may occur via a gesture performed by the user, audible/inaudible sound input provided by the user or visible/non-visible light wave input. Under this scenario, the gesture, sound or light signal may correspond to a secret pattern of inputs required to be provided by the user as they are within physical proximity of the transaction agent 105. Transference of the secret pattern may be facilitated, in certain embodiments, by way of a bond application 118 operating at the user device 101. Alternatively, the transference mechanism may be encoded as one or more instructions of the personal item 102, e.g., encoded within a sensor of a plastic card for activation based on a proximity condition.

In certain embodiments, initiation of a transactional session is authorized for commencement based on biometric authentication of the user. For example, a biometric module 123 may be configured to gather, exchange and process multiple different types of biometric data pertaining to the user. This includes, for example, the gathering of voice data concurrent with the gathering of video data of the user's face. Various sensors of the user device 101 are employed to facilitate the gathering of voice and face characteristics of the user.

Alternatively, a collection system, device or sensor bank at the location of the transaction agent 105 may be used to gather the data. It is contemplated that the biometric authentication of the user may be performed at the user device 101, by the transient services platform 103, or a combination thereof for enabling a level of secure transaction authentication to be performed.

Also, in certain embodiments, the biometric module 123 may operate in connection with the bond application 118, such that when the bond application 118 is called for execution, a preliminary authentication of the user is performed. Actual biometric authentication of the user may established as criteria for execution of the bond application 118—e.g., for initiating a bonding procedure between a specific personal item 102 and/or user device 101 and the various transaction agents 105a-105n.

In summary, the following scenarios exist with respect to system 100 for facilitating a transactional session. In one scenario, the user that solicits a request for a transactional session is a person currently located in the defined geographic region 104, having access to one or more transaction agents 105a-105n. The user is aware of a fact, e.g., password, that can be cross-checked by the transient services platform 103 against something the user has physical access to, e.g. user device 101 or personal item 102.

In another use case, the personal item may be used to initiate a bonding procedure in conjunction with the transaction agent 105, e.g., based on a secret pattern. The secret pattern may correspond to a combination of gestures, sounds or light wave inputs. Also, the transient services platform 103 has access to scored grid data 108 regarding the defined geographic region 104, therefore enabling the platform 103 to correlate a specific contextual category, and therefore transaction type, with the defined geographic region 104. Further, a number of transaction agents 105a-105n are also located in the same defined geographic range 104, and particularly, activated from within the same proximity of the user.

Based on the above explanation, an exemplary transactional session/procedure carried out with respect to the platform 103 of system 100 is as follows: (1) the user provides biometric authentication, e.g., done locally, for enabling a session request to be initiated. This may include facial recognition, fingerprint authentication, retinal scanning, brain wave pattern scanning, Deoxyribonucleic Acid (DNA) scanning, etc.; (2) the session request is enabled wirelessly, as facilitated via a bonding mechanism between the transaction agents 105 and a personal item 102 of the user. Validation of the handshake may be facilitated or confirmed by the transient services platform 103 by way of transference of the input data (e.g., motion and/or light data) via a communication network; (3) the transient services platform 103 accesses scored grid data 108 based on an association between the transaction agents 105a and the defined area 104 in which they are located; and (4) the transient services platform 103 derives, based on the scored grid data 108, the possible transaction types/contexts of the request by analyzing the respective scores and the qualified transaction agents 105 for the corresponding region 104.

It is noted that the transient services platform 103 allows for anonymity to be maintained during the transactional session. Hence, while there is non-repudiatable cross-referencing of the transactional agents for a given geographic area or cross-referencing of user biometric data with a profile of the user, no sensor data is gathered with respect to the user. Moreover, the transient services platform 103 is contextually agnostic, therefore enabling the context to be defined subsequent to the request as opposed to being a conditional variable for facilitation of the transactional request. As such, the transient services platform 103 may be used in connection with various user device 101 and other personal items of the user as an alternative to near-field communication. Under this approach, user device 101 generated sensor data is not required to support the transactional process.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user devices 101a-101n can support any type of interface for supporting the presentment or exchange of data. In addition, user devices 101a-101n may facilitate various input means for receiving and generating information, including touch screen capability, keyboard and keypad data entry, voice-based input mechanisms and the like. Any known and future implementations of user devices 101 are applicable. For the purpose of illustration, user devices 101a-101n may be devices for accessing the affinity determination platform 103 as a user of an application 118 or as a service provider.

In certain embodiments, user devices 101a-101n, the affinity determination platform 103, services 105 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 105 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, e.g., IP addresses that are accessible to devices connected to the service provider network 109 as facilitated via a router.

Figure 2:
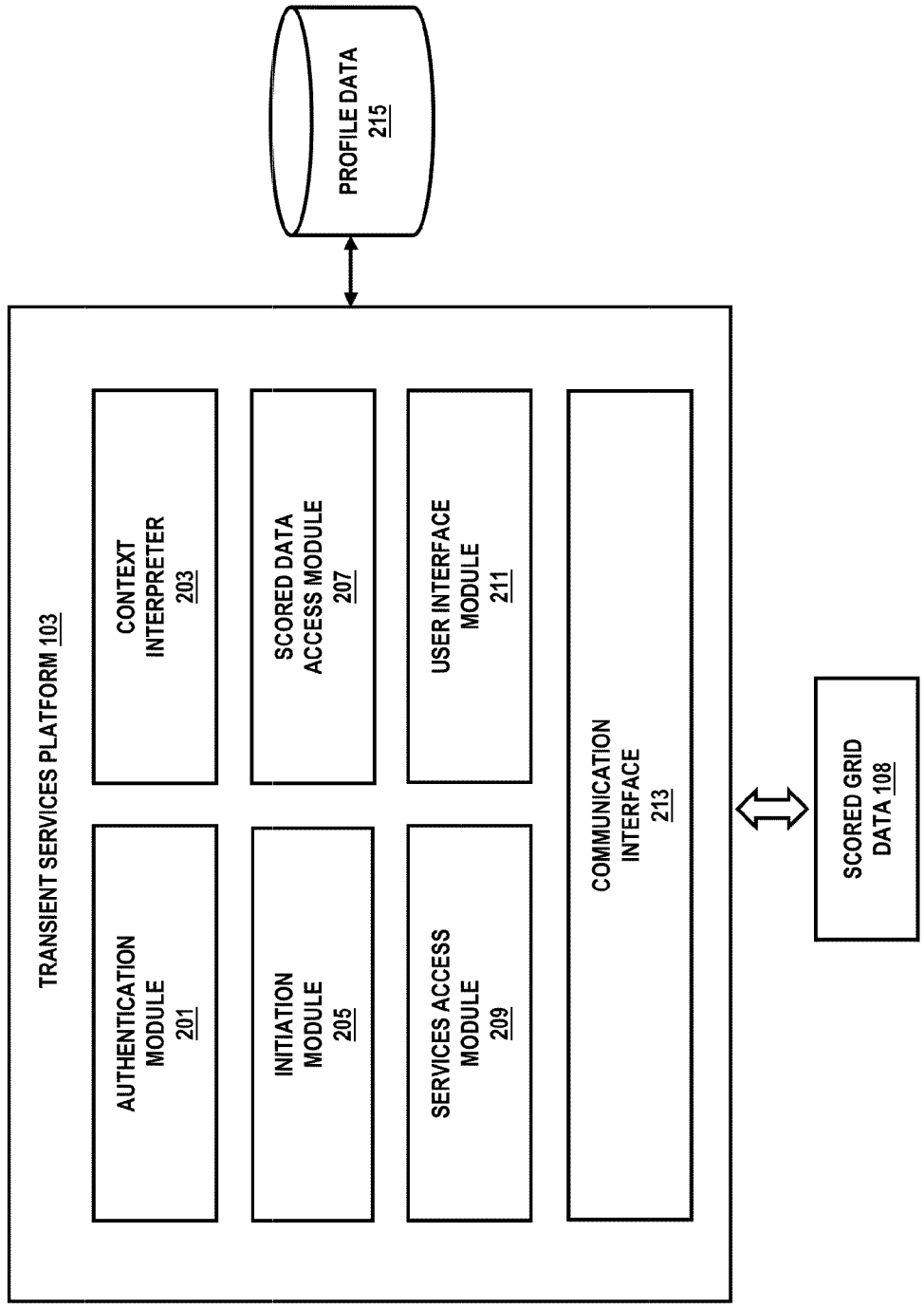
FIG. 2 is a diagram of the components of a transient services platform, according to one embodiment.

FIG. 2 is a diagram of the components of a transient services platform, according to one embodiment. The transient services platform 103 includes various executable modules for performing one or more computing, data processing and network based instructions that in combination provide a means of enabling transactions to be performed securely within a defined geographic region. Such modules can be implemented in hardware, firmware, software, or a combination thereof. By way of example, the transient services platform 103 may include an authentication module 201, a context interpreter 203, an initiation module 205, a scored data access module 207, a services access module 209, a user interface module 211 and a communication interface 213.

In addition, the transient services platform 103 also accesses the scored grid data 108, such as from a third-party location based service provider. In addition, the platform may maintain profile data 215 related to one or more users subscribed with a provider of the platform 103. Still further, while not shown, the platform 103 may access credentials data 110 related to the user, as maintained by a credential management service. It is noted that modules 201-213 access one or more of these peripheral data sources for performing their respective functions.

In one embodiment, an authentication module 201 authenticates users of user devices 101 or personal item 102 for interaction with the platform 103. By way of example, the authentication module 201 receives a request to subscribe to the platform 103. The subscription process may include, for example, establishing one or more access credentials and usage policies, along with biometric profile data related to the user. One or more privacy settings and/or preferences may also be established, including a secret pattern to be used in connection with a bonding procedure. Preferences and settings information may be referenced to a specific user, user device, service provider, or combination thereof, and maintained as subscription data (not shown).

The authentication process performed by the module 201 may also include receiving and validating access credentials for a particular user. For example, a login name and/or user identification value may be received from the user device 101 or other device via a graphical user interface to the platform 103 (e.g., as provided via a transaction agent). Subscription data for respective subscribers, which contains pertinent user or device profile data, may be cross referenced as part of the login process. Alternatively, the login process may be performed through automated association of profile settings maintained as registration data 217 with an IP address, a carrier detection signal of a user device, mobile directory number (MDN), subscriber identity module (SIM) (e.g., of a SIM card), radio frequency identifier (RFID) tag or other identifier.

It is contemplated, in certain embodiments, that the authentication module 201 may also be configured to perform various biometric authentication procedures. This corresponds to an implementation wherein the authentication is not performed locally, e.g., via the user device. Alternatively, a combination of local device and/or transaction agent related processing may be performed concurrent with platform 103 based authentications to facilitate expedited user authentication. Regardless of the implementation, the authentication module 201 receives initial requests for establishment of a transactional session via the platform 103.

In one embodiment, the context interpreter 203 identifies a specific set of contextual categories, per the categories data 107a, are to be related to a particular defined geographic region. The interpreter 203 then associates a particular transaction type with the particular transaction agents corresponding to the request received by the authentication module 201. Operating in connection with the context interpreter 203 is the scored data access module 207, which facilitates the gathering of scored grid data 108 from a third party location based service. The context interpreter thus analyzes the scored grid data as well as cross references the data against a list of known transaction agents 105 associated with the defined region.

In one embodiment, the initiation module 205 receives a request to complete the transaction via a transaction agent associated with a defined geographic region. This includes authenticating a handshake associated with the bonding procedure. Hence, the initiation module 205 may verify the authenticity of a given secret pattern provided per the handshaking process. In addition, the module 205 may also trigger execution of the services access module 209 for facilitating establishment of a session with a credentials management service 107 associated with the user, e.g., as indicted within the profile data 215. As noted, the credentials management service may host specific data related to the user required for fulfilling a transaction, including credit card information, access and/or security information, etc.

The initiation module 205 utilizes the results of the context interpreter 203 to indicate to the credential management service which particular credentials are required. For example, in the case of a purchase transaction, payment processing credentials are requested. In the case of user access to a security gate or other barrier, associated access information is requested. Once the appropriate credentials are accessed, the initiation module 205 further initiates transfer of the credentials associated with the user to the transaction agent associated with the defined geographic region. The initiation module then alerts the authentication module 201 of completion of the transaction, which causes an ending of the established transaction session via the communication interface 213.

In one embodiment the user interface module 211 enables presentment of a graphical user interface for presenting the output data 110. By way of example, the user interface module 211 generates the interface in response to application programming interfaces (APIs) or other function calls corresponding to a browser application or dedicated application; thus enabling the display of graphics primitives. As another example, the user interface module 211 may also operate in connection with a calling service or application to permit rendering, transformation, or translation of the output data in response to a request.

In one embodiment, a communication interface 213 enables formation of a session over a network 109 between the platform 103, the services 121 and/or 107 and the transaction agents 105. By way of example, the communication interface 213 executes various protocols and data sharing techniques for enabling collaborative execution between a subscriber's user device 101 (e.g., mobile devices, laptops, smartphones, tablet computers, desktop computers, servers, workstations) and the platform 103 over the network 109. It is noted that the communication interface 213 is also configured to support a browser session—e.g., the retrieval of content as referenced by a resource identifier during a specific period of time or usage of the browser.

Figure 3A:
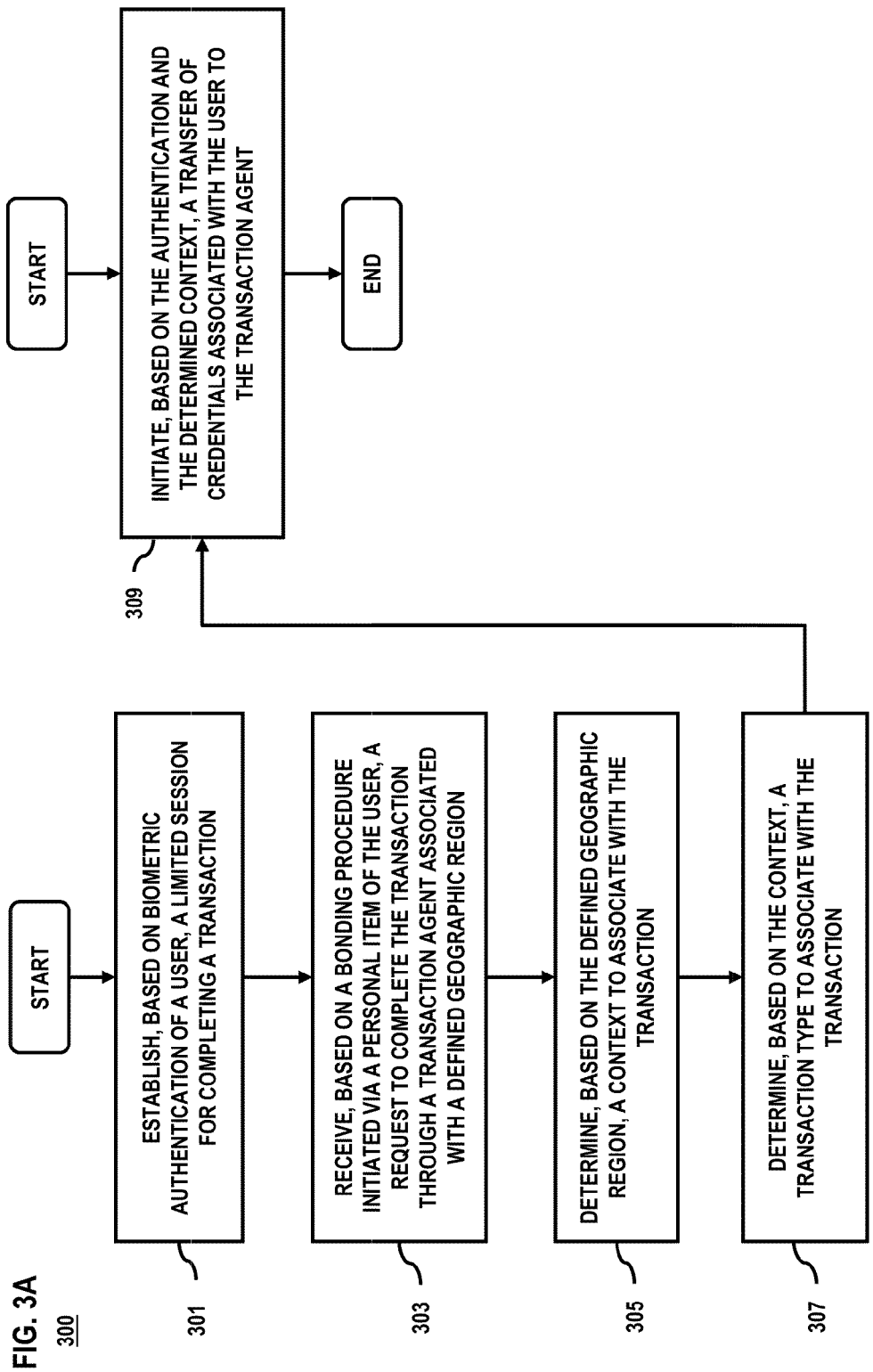
Figure 6:
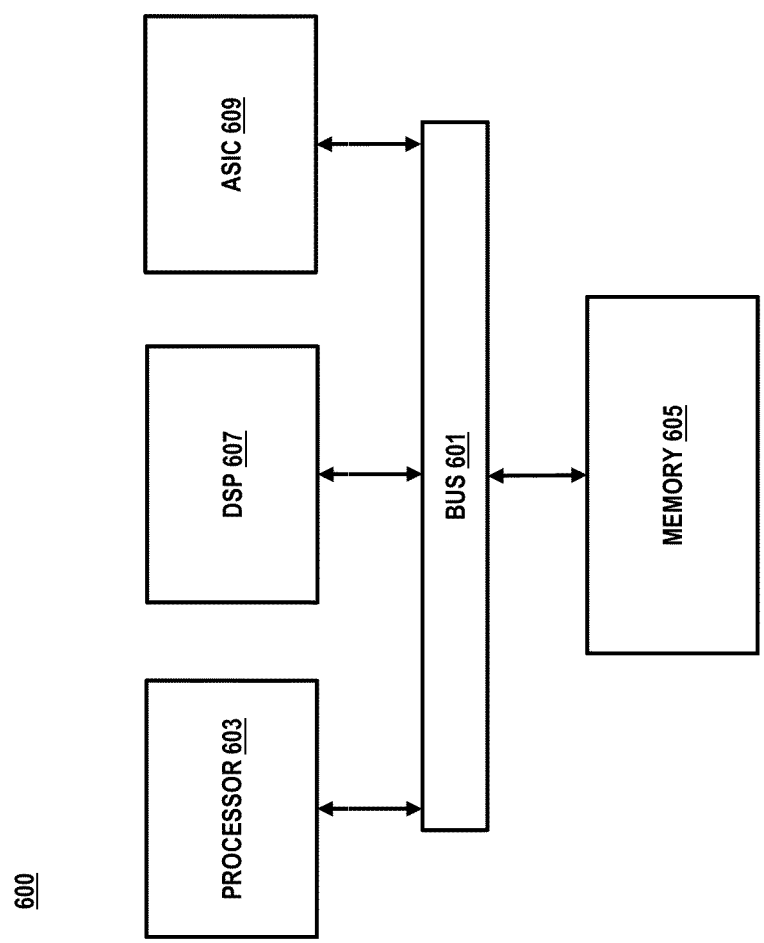
FIG. 6 is a diagram of a chip set that can be used to implement an embodiment of the invention.

The above presented modules and components of the platform 103 can be implemented in hardware, firmware, software, or a combination thereof. In another embodiment, one or more of the modules 201-213 may be implemented for operation by users as a platform, hosted solution, cloud based service, or the like. It is noted that the various modules may be used selectively or in combination within the context of a location based service or transaction fulfillment service FIGS. 3A-3C are flowcharts of processes for enabling transactions to be performed securely within a defined geographic region, according to various embodiments. In one embodiment, the transient services platform 103 performs processes 300, 310 and 318, and is implemented in, for instance, a chip set including a processor and a memory as shown in FIG. 6. For the purpose of illustration, the processes are described with respect to FIG. 1. It is noted that the steps of the process may be performed in any suitable order, as well as combined or separated in any suitable manner.

In step 301 of process 300 (FIG. 3A), the transient services platform 103 establishes, based on biometric authentication of a user, a limited session for completing a transaction. By way of example, the biometric authentication may be performed locally at a user device 101. Alternatively, the location for facilitating the transaction may be equipped with various sensors and/or scanners for performing biometric authentication. Under the latter scenario, the biometric authentication procedure is performed via a local computer terminal operating in connection with a biometric application of the device.

As noted, the limited session may correspond to a length of time allotted for completing the transaction. In addition, the limited session also refers to a limited time-to-live of a session once established, e.g., only a one time transaction is enabled. This execution also enables additional security to be associated with the transactional process as repeat unauthorized attempts are eliminated.

In step 303, the platform 103 receives, based on a bonding procedure initiated via a personal item of the user, a request to complete the transaction through a transaction agent associated with a defined geographic region. It is noted that the bonding procedure is carried out between the transaction agent and the personal item, and may include validation of a handshake between the respective agent and the personal item (e.g., user device 101). The transient services platform 101 may receive, from the transaction agent, notification that the bond was generated, thus triggering submission of the request.

Per step 305, the platform 103 determines, based on the defined geographic region, a context to associate with the transaction. In step 307, the platform 103 determines, based on the context, a transaction type to associate with the transaction. As noted, the context may correspond to a particular transaction type for denoting various characteristics, details or qualities associated with the transactional request. In another step 307, the platform 103 initiates, based on the authentication and the determined context, a transfer of credentials associated with the user to the transaction agent. As noted previously, the credentials are retrieved by the platform 103 from a credential management service assigned by the user.

In step 311 of process 310, the platform 103 receives a biometric input for authenticating an identity of the user. Per step 313, the platform 103 also associates the user with a personal item based on the identity. As noted previously, this association may be based on cross-referencing of the personal item with data maintained in a profile database regarding the user. This is performed for enablement of the bonding procedure between a respective device and a given transaction agent, e.g., as a further security or session establishment requirement, and not for context determination purposes. In step 315, the platform 103 authenticates a handshake associated with the bonding procedure. The handshake may be a gesture, sound or light signal that corresponds to a secret action associated with the user and/or the personal item of the user.

In step 319 of process 318, the platform 103 initiates, based on the authentication, a session with a credentials management service associated with the user. Per step 321, the platform 103 also submits, based on the context, a request for credentials required for completion of the transaction. As noted previously, the context is defined based at least in part on the accessing of scored grid data 108, including analysis of one or more scores, signal strengths and colors associated with a defined reference grid. In steps 323 and 325, the platform 103 confirms completion of the transaction within the limited time period and ends the session based on the confirmation.

Figure 4B:
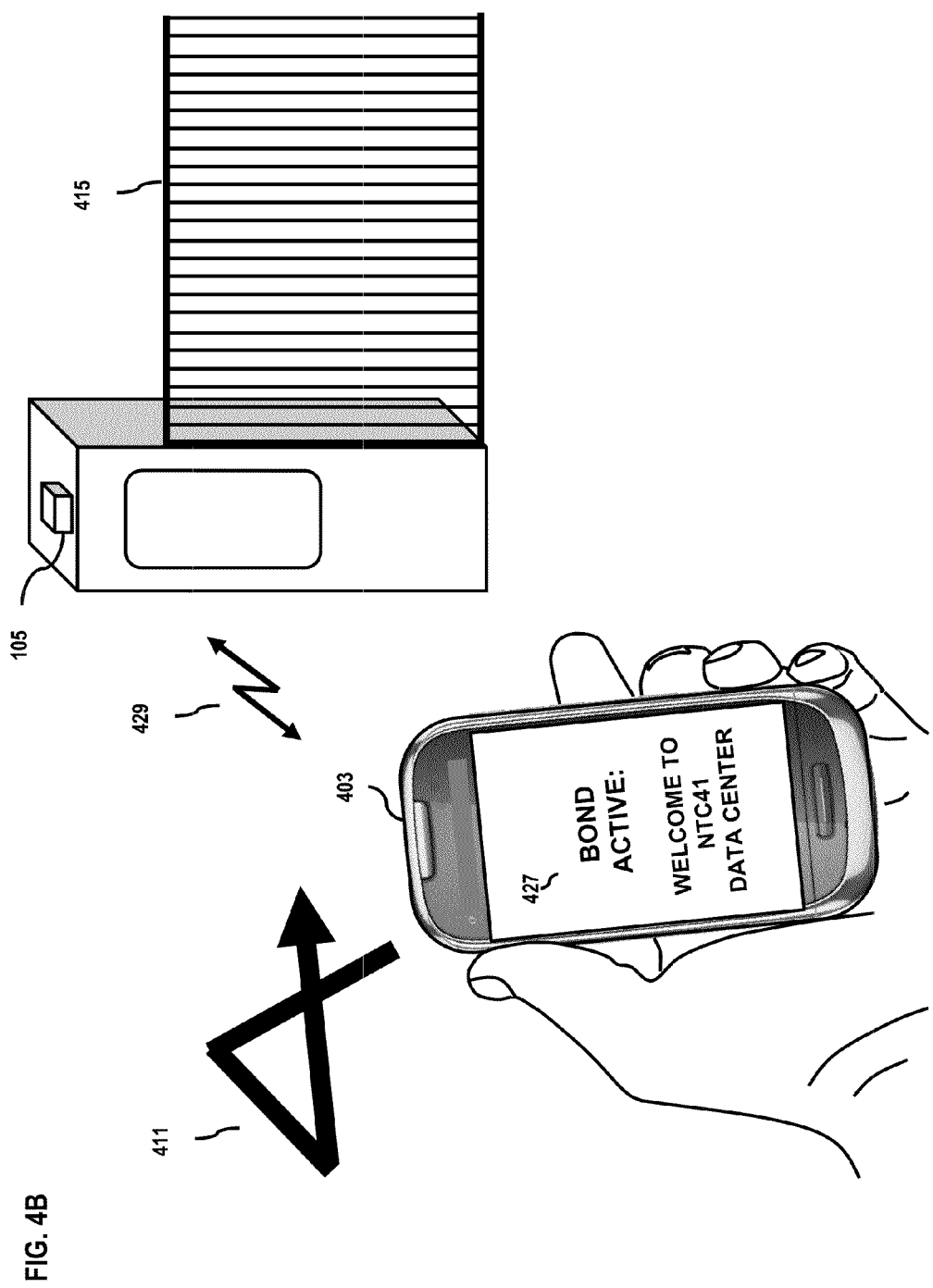
Figure 4C:
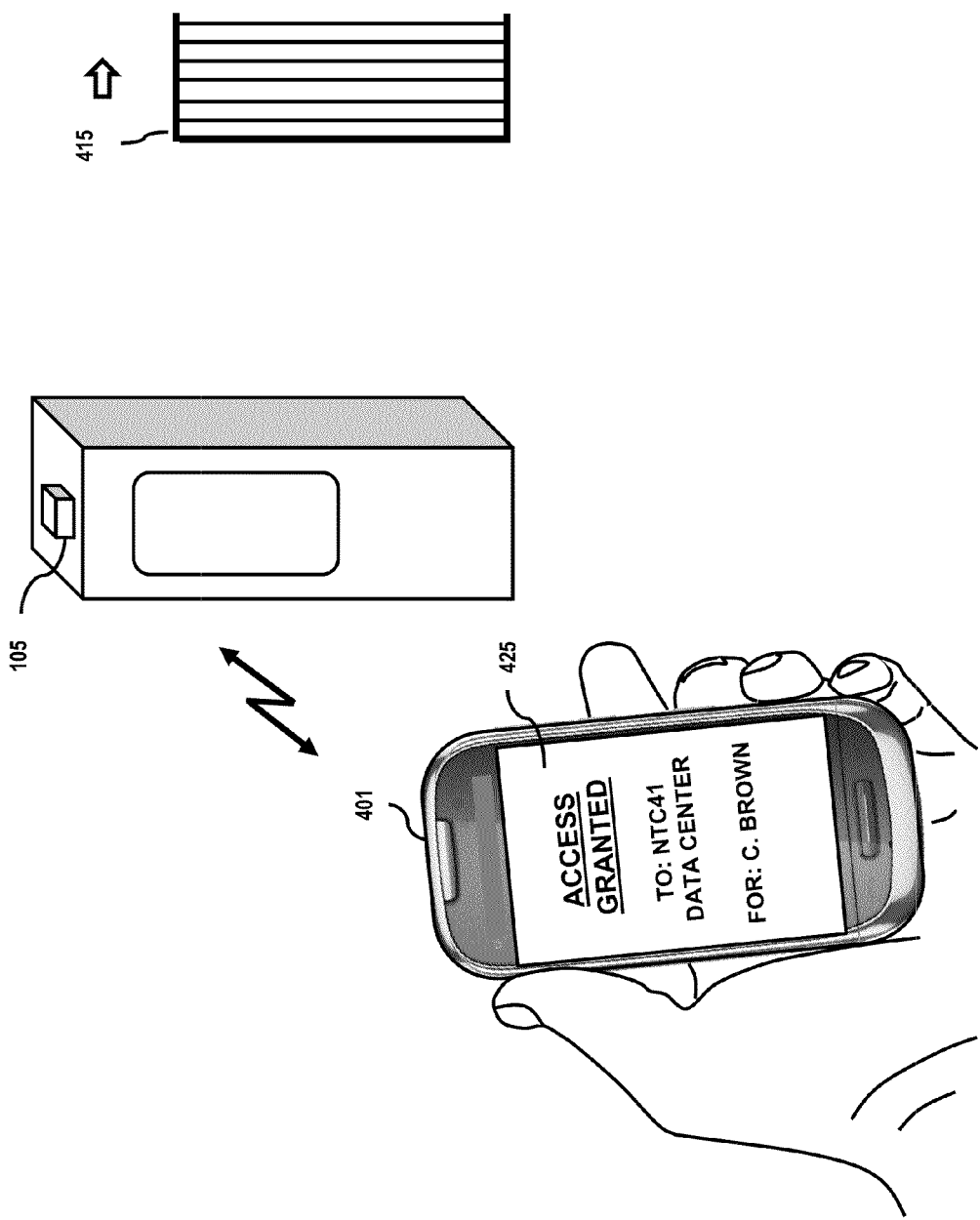

FIGS. 4A-4C are diagrams depicting a user accessing the transient services platform of FIG. 2 to perform a transaction via a transaction agent, according to various embodiments. For the purpose of illustration, the figures are described from the perspective of an exemplary use case of a user attempting to access a security gate 415, as shown in FIG. 4B. Under this scenario, the user has already defined a set of credentials for accessing the facility associated with the security gate (e.g., defined hours of entry, access level) in connection with the facility owner. In addition, the security gate 415 features an unmanned booth having configured thereto a transaction agent 105. As such, the user may initiate execution of a transaction session with the transient services platform for fulfilling a gate access/facility entry transaction.

In FIG. 4A, the user is shown performing the biometric authentication procedure according to different approaches, both of which pertain to local processing of biometric inputs. As noted, the biometric authentication is a prerequisite security function required to enable a transaction session request to be submitted to the platform 103. In a first approach, labeled OPTION 1, the user 401 employs a personal item in the form of their mobile device 403 to perform the biometric authentication. Under this scenario, a biometric application operating at the mobile device 403 receives voice signals 405 corresponding to a phrase required to be recited by the user. While not shown or discussed extensively herein, the phrase may correspond to that required to be recited during an initial enrollment process. In addition to voice data, visual data pertaining to the user's face may also be collected concurrent with the voice signal 405. Additional biometric inputs such as retinal, DNA, brain wave pattern and/or odor related data may also be performed.

In the second approach labeled OPTION 2, instead of the local device, the user employs a device 407 positioned within proximity of the security gate. For example, the security gate may feature a computer terminal or data entry/collection node that features one or more sensors for facilitating the gathering of biometric information. Under this scenario, the user may be presented with various interface options for facilitating the input gathering process as well as for accessing the transient services platform 103. It is noted, with regards to OPTION 2, that the computer terminal and/or data entry/collection node may operate in conjunction with the user device 403. Regardless of implementation, the biometric authentication is performed locally, with results of the authentication being used to enable a limited time session for completion of the transaction.

Once the user is authenticated, the user initiates a bonding procedure with the transaction agent 105 of the security gate 415. This includes, for example, launching a bond application at the mobile device 403. The user then performs a secret pattern 411 corresponding to the execution of the bonding application. As noted previously, the pattern 411 corresponds to a "handshake" or other triggering mechanism related to or initiated by the user; the handshake being unique to the user. While shown as a motion/gesture in this example, the handshake for initiating a bond may also be a sound, light signal or a combination thereof.

As a result of the secret pattern 411 being performed, a wireless communication exchange (represented by the signal 429) is formulated between the device and the transaction agent 105. This exchange signifies validation of the handshaking procedure and hence an active bond between the transaction agent 105 of the security gate 415 and the device 403. Under this scenario, the bond application causes presentment of a notification message 427 to the user interface of the device 403 for indicating that bond detection mode is active. In certain embodiments, the notification message may also include a timer for indicating an amount of time remaining for the user to establish and/or complete a transaction session for accessing the gate 415.

In response to the bonding procedure being performed, the request to initiate a gate entry transaction is facilitated. This is carried out by way of the communication network 105, wherein the transaction agent alerts the transient services platform 103 of a request to initiate a transaction. Consequently, the transient services platform 103 accesses scored grid data corresponding to the defined geographic region associated with the transaction agent 105. Based on information, the platform 103 is then able to discern a limited number of possible corresponding transaction types associated with the defined region. In certain embodiments, the platform 103 may utilize the credentials data associated with the user 401 or other corroborating information to further isolate the possibility to a single selection. Of note, a higher score and/or signal strength associated with the given geographic region also factors into the determination process.

Once the context is determined, the credentials associated with the user with respect to the transaction type associated with the security gate 415 is accessed. These credentials are then transferred to the transaction agent 105 to permit execution of the gate entry process, as shown in FIG. 4C. Also, a notification message 425 is presented to the display of the device 403 is updated to reflect that entry (completion) of the transaction was fulfilled and granted in connection with the specific credentials of the user 401.

The exemplary techniques and systems presented herein enables contextual categories to be associated and scored in connection with a defined geographic region. One advantage of the exemplary techniques and systems presented herein is the ability of the transient service platform to recognize the context of a transaction without reliance upon user or device provided contextual information. Another advantage is that multiple methods of discovery for initiating a bond can be mixed and matched automatically without requiring intervention from the user—e.g., Bluetooth, Wi-Fi, NFC, wireless sensor network (WSN) and/or 3G/4G technologies. As such, the transient services platform 103 facilitates pre-NFC and/or legacy mobile devices to benefit from the dissemination of transaction agents about a geographic region.

The processes described herein for enabling contextual categories to be associated and scored in connection with a defined geographic region may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

The processes described herein for enabling transactions to be performed securely within a defined geographic region may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
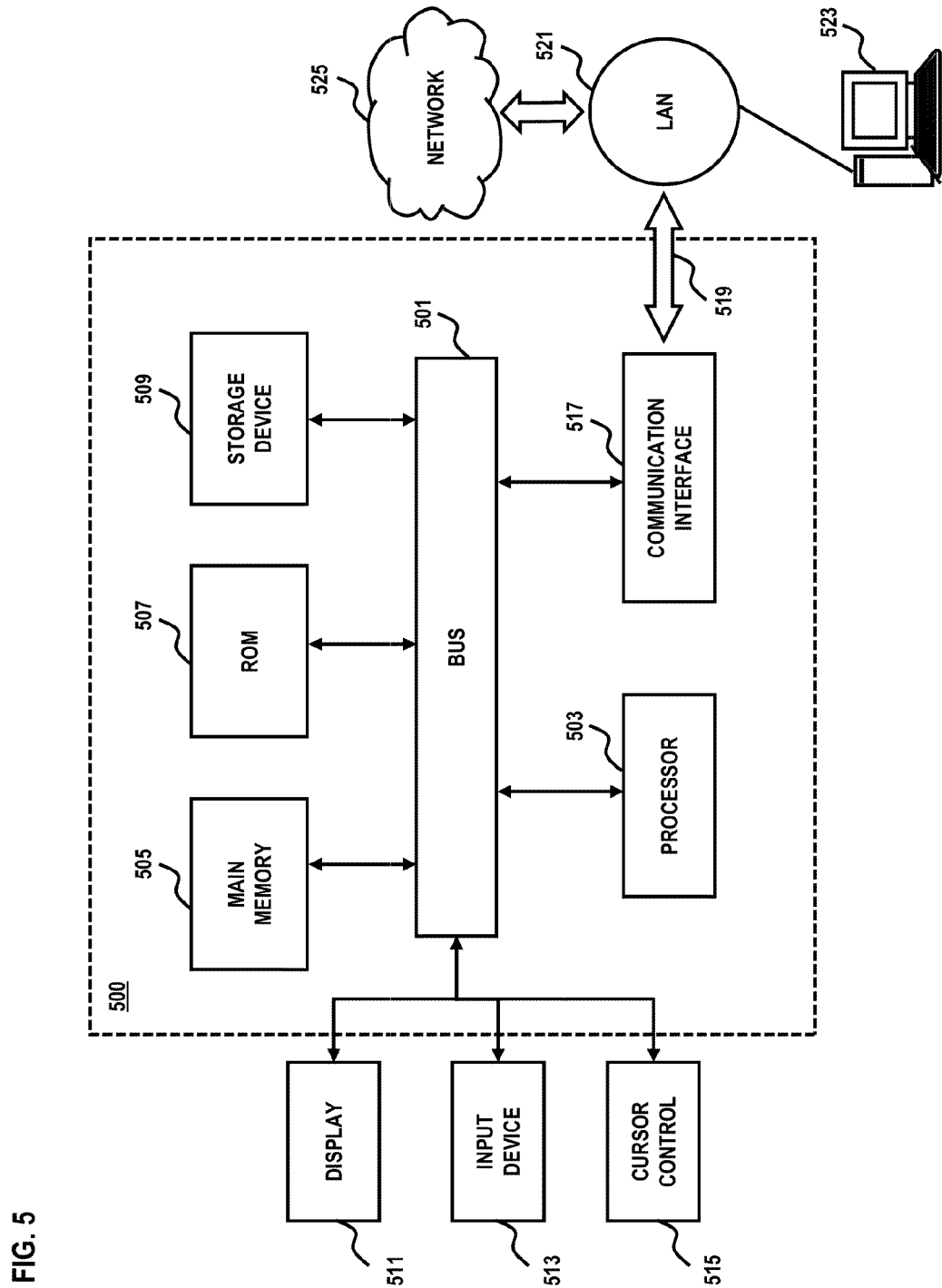
FIG. 5 is a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIGS. 4B and 4C multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—e.g., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to enable transactions to be performed securely within a defined geographic region as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling transactions to be performed securely within a defined geographic region.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable transactions to be performed securely within a defined geographic region. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A machine-implemented method comprising:
    establishing, based on biometric authentication of a user, a limited session for completing a transaction;
    receiving, based on a bonding procedure initiated via a personal item of the user, a request to complete the transaction through a transaction agent associated with a defined geographic region;
    determining, based on the defined geographic region, a context to associate with the transaction; and
    initiating, based on the authentication and the determined context, a transfer of credentials associated with the user to the transaction agent wherein the bonding procedure comprises authenticating a handshake associated with the bonding procedure, and wherein the handshake corresponds to a secret action associated with the user and the personal item.

2. A machine-implemented method comprising:
    establishing, based on biometric authentication of a user, a limited session for completing a transaction;
    receiving, based on a bonding procedure initiated via a personal item of the user, a request to complete the transaction through a transaction agent associated with a defined geographic determining, based on the defined geographic region, a context to associate with the transaction;
    determining, based on the context, a transaction type to associate with the transaction; and
    initiating, based on the authentication and the determined context, a transfer of credentials associated with the user to the transaction agent,
    wherein the transaction type is identified based on a signal strength associated with the defined geographic region, the signal strength indicating a level of affinity between the transaction agent and the transaction type.

3. A machine-implemented method of claim 1, further comprising:
    receiving a biometric input for authenticating an identity of the user; and
    associating the user with a personal item based on the identity,
    wherein the personal item is a mobile device, a transmitter or a sensor based card.

4. A machine-implemented method of claim 1, wherein the handshake is a gesture, a sound or a light signal.

5. A machine-implemented method of claim 1, wherein the handshake is performed within close proximity of the transactional agent within the limited time period corresponding to the session.

6. A machine-implemented method of claim 1, further comprising:
    initiating, based on the authentication, a session with a credentials management system associated with the user.

7. A machine-implemented method of claim 1, further comprising:
    submitting, based on the context, a request for credentials required for completion of the transaction, wherein the credentials include information for completing the transaction based on the context.

8. A machine-implemented method of claim 1, further comprising:
    confirming completion of the transaction within the limited time period; and
    ending the session based on the confirmation.

9. A machine-implemented method of claim 1, wherein the defined geographic region is based on a national grid system.

10. An apparatus comprising:
    at least one processor; and
    at least one memory including computer program code for one or more programs,
    the at least one memory and the computer program code configured to, with the at least one processor, cause the apparatus to perform at least the following,
        establish, based on biometric authentication of a user, a limited session for completing a transaction;
        receive, based on a bonding procedure initiated via a personal item of the user, a request to complete the transaction through a transaction agent associated with a defined geographic region;
        determine, based on the defined geographic region, a context to associate with the transaction; and
        initiate, based on the authentication and the determined context, a transfer of credentials associated with the user to the transaction agent,
        wherein the bonding procedure comprises authenticating a handshake associated with the bonding procedure, and
        wherein the handshake corresponds to a secret action associated with the user and the personal item.

11. An apparatus comprising:
    at least one processor; and
    at least one memory including computer program code for one or more programs,
    the at least one memory and the computer program code configured to, with the at least one processor cause the apparatus to perform at least the following,
        establish, based on biometric authentication of a user, a limited session for completing a transaction;
        receive, based on a bonding procedure initiated via a personal item of the user, a request to complete the transaction through a transaction agent associated with a defined geographic region;
        determine, based on the defined geographic region, a context to associate with the transaction;
        determine, based on the context, a transaction type to associate with the transaction; and
        initiate, based on the authentication and the determined context, a transfer of credentials associated with the user to the transaction agent, wherein the transaction type is identified based on a signal strength associated with the defined geographic region, the signal strength indicating a level of affinity between the transaction agent and the transaction type.

12. An apparatus of claim 10, further comprising:
receiving a biometric input for authenticating an identity of the user; and
associating the user with a personal item based on the identity,
wherein the personal item is a mobile device, a transmitter or a sensor based card.

13. An apparatus of claim 10, wherein the handshake is a gesture, a sound or a light signal.

14. An apparatus of claim 10, wherein the handshake is performed within close proximity of the transactional agent within the limited time period corresponding to the session.

15. An apparatus of claim 10, further comprising:
initiating, based on the authentication, a session with a credentials management system associated with the user.

16. An apparatus of claim 10, further comprising:
submitting, based on the context, a request for credentials required for completion of the transaction,
wherein the credentials include information for completing the transaction based on the context.

17. An apparatus of claim 10, further comprising:
confirming completion of the transaction within the limited time period; and
ending the session based on the confirmation.

18. An apparatus of claim 10, wherein the defined geographic region is based on a national grid system.

* * * * *